(12) United States Patent
Parker

(10) Patent No.: US 8,868,636 B2
(45) Date of Patent: Oct. 21, 2014

(54) APPARATUS FOR SECURED DISTRIBUTED COMPUTING

(76) Inventor: Lansing Arthur Parker, Los Angeles, CA (US)

( * ) Notice: Subject to any disclaimer, the term of this patent is extended or adjusted under 35 U.S.C. 154(b) by 147 days.

(21) Appl. No.: 13/487,636

(22) Filed: Jun. 4, 2012

(65) Prior Publication Data

US 2012/0254966 A1 Oct. 4, 2012

Related U.S. Application Data

(63) Continuation-in-part of application No. 13/079,765, filed on Apr. 4, 2011, and a continuation-in-part of application No. 13/402,151, filed on Feb. 22, 2012.

(51) Int. Cl.
*G06F 15/16* (2006.01)
*G06F 9/50* (2006.01)

(52) U.S. Cl.
CPC .................................. *G06F 9/5027* (2013.01)
USPC .......................................... 709/201; 709/203

(58) Field of Classification Search
CPC ................................................. H04L 63/0838
USPC .......................................................... 709/201
See application file for complete search history.

(56) References Cited

U.S. PATENT DOCUMENTS

| 2011/0113098 A1* | 5/2011 | Walsh et al. | 709/204 |
| 2011/0283017 A1* | 11/2011 | Alkhatib et al. | 709/244 |
| 2012/0084566 A1* | 4/2012 | Chin et al. | 713/175 |

* cited by examiner

*Primary Examiner* — Wing F Chan
*Assistant Examiner* — Andrew Woo
(74) *Attorney, Agent, or Firm* — Mitchell Law PLLC; Matthew W. Mitchell

(57) ABSTRACT

An apparatus for distributed computing is disclosed. The apparatus includes a semiconductor memory, a biometric device for receiving biometric data, a connector for establishing communication between the apparatus and the host device, and a processor for performing distributed computing methods. The distributed computing method includes identifying a computing task for processing, authenticating user and device with a distributed computing network, receiving a unique security code having an end-of-session expiration, requesting that the computing task be executed over the distributed computing network, receiving a one-time task code, selecting a device to process the computing project from among a plurality of devices based upon device location and at least one associated operating state of the device, sending the identified computing task and the one-time task code to the selected device over the distributed computing network for processing and authentication, and receiving results of computing task from the selected device.

20 Claims, 12 Drawing Sheets

US 8,868,636 B2

APPARATUS FOR SECURED DISTRIBUTED COMPUTING

CROSS REFERENCE TO RELATED APPLICATIONS

This application is a continuation-in-part of U.S. patent application Ser. No. 13/079,765 filed Apr. 4, 2011 incorporated herein by reference and U.S. patent application Ser. No. 13/402,151 filed Feb. 22, 2012 incorporated herein by reference.

TECHNICAL FIELD

This disclosure relates to distributed computing services, and more particularly to accessing distributed computing services using a portable device.

BACKGROUND

The statements in this section merely provide background information related to the present disclosure and may not constitute prior art.

Known computing systems use shared servers to provide resources, software, and data to computers as requested by a client computer. In many applications, remote, off-site computing resources are used to supplement on-site computing resources. In a "cloud computing" system, data and software applications may be run on a server permitting users to access the data and applications independent of user location. For example, a cloud computing system may enable web-based tools or applications that users can access and use through a web browser similar to a program installed locally on their own computer. Typical cloud computing providers deliver common business applications online that are accessed from another web service or software like a web browser, while the software and data are stored on servers. Many cloud computing systems consist of services delivered through servers.

Distributed computing is presently utilized to process computing projects. Generally, a distributed computing system includes a number of separate computers ready to perform computational tasks and provide computing capacity when necessary. Computers utilized in a distributed computing system are made available to take on defined computing tasks when the computer is not otherwise put to use. In addition to lending computing capacity as a member of the distributed computing system, individual computers also require electrical power to process the requests. Current distributed computing systems and share and request computing resources independent of particular device operating states such as device power capacity or availability. In a mobile application, this is particularly problematic as battery supply and capacity may be quite limited. Therefore, it would be advantageous to provide distributed computing among devices based upon operating states of the particular devices.

Concentrated computing resources such as in a cloud computing system disadvantageously expose users to data and application loss in event of a malfunction or disruption in network access. Therefore, it would be advantageous to combine aspects of a distributed computing system with aspects of a remote access system such as a cloud computing system to provide computing services including services based on user location.

Further, communication and informational transmission over public and private networks expose users to security risks. Therefore, there is a need to mitigate informational loss and public exposure of transmitted and stored data over networks.

SUMMARY

An apparatus for distributed computing is disclosed. The apparatus includes a semiconductor memory, a biometric device for receiving biometric data, a connector for establishing communication between the apparatus and the host device, and a processor for performing distributed computing methods. The distributed computing method includes identifying a computing task for processing, authenticating user and device with a distributed computing network, receiving a unique security code having an end-of-session expiration, requesting that the computing task be executed over the distributed computing network, receiving a one-time task code, selecting a device to process the computing project from among a plurality of devices based upon device location and at least one associated operating state of the device, sending the identified computing task and the one-time task code to the selected device over the distributed computing network for processing and authentication, and receiving results of computing task from the selected device.

Certain embodiments of the invention include a feature of a unique communication protocol including security codes, data location, and application location corresponding to remote data and application storage.

This summary is provided merely to introduce certain concepts and not to identify key or essential features of the claimed subject matter.

BRIEF DESCRIPTION OF THE DRAWINGS

One or more embodiments will now be described, by way of example, with reference to the accompanying drawings, in which.

DETAILED DESCRIPTION

Figure 1:
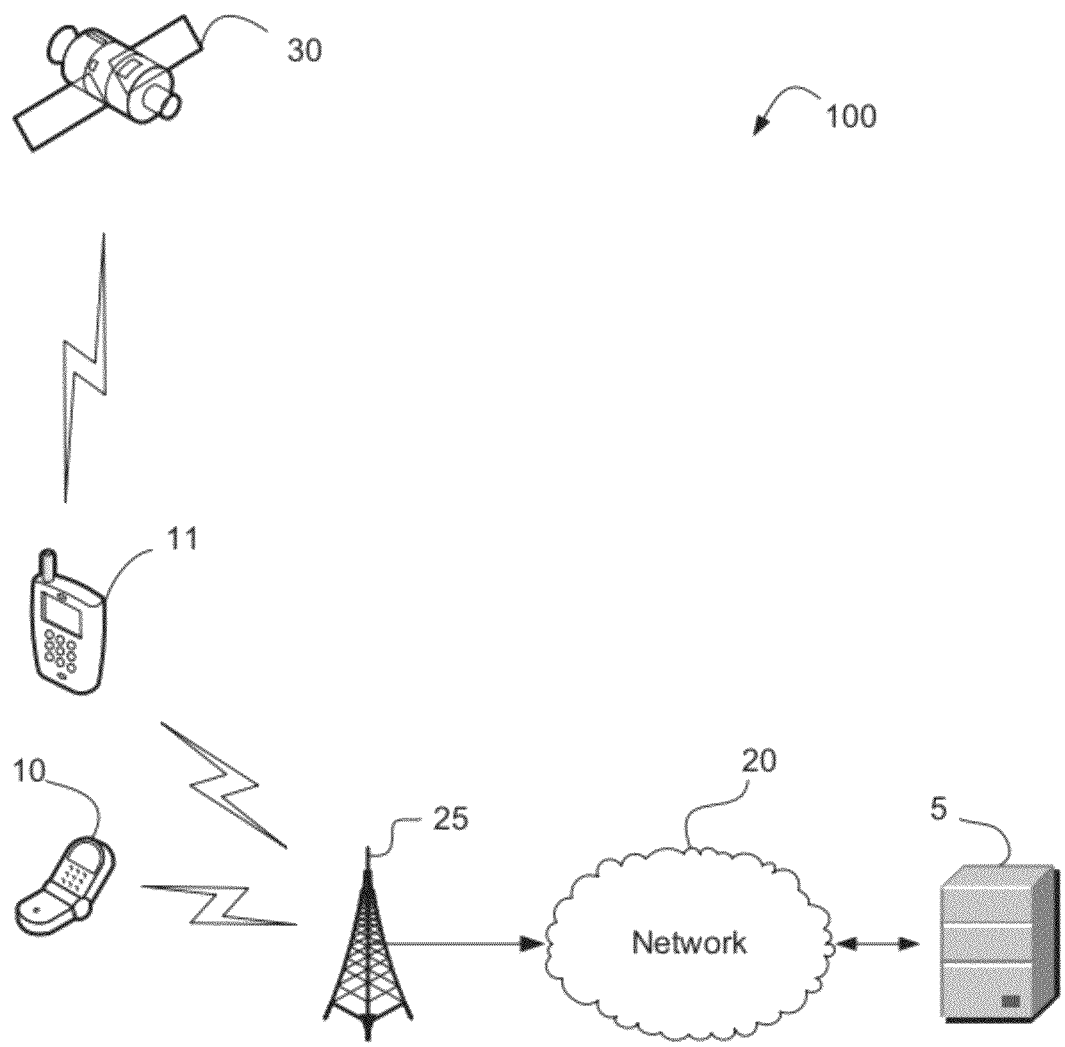
FIG. 1 is a block diagram of an exemplary communication system, in accordance with the present disclosure.

Referring now to the drawings, wherein the depictions are for the purpose of illustrating certain exemplary embodiments only and not for the purpose of limiting the same, FIG. 1 is a block diagram of an exemplary communication system 100 including a server 5, a plurality of devices 10, a network 20, a radio communication tower 25, and communication satellite 30 that have been constructed in accordance with an embodiment of the disclosure. As shown in FIG. 1, the server 5 may be directly communicatively connected and communicatively connected via the network 20. The device 10 is connected to the network 20 via the radio communication tower 25. Components of the communication system 100 are shown in FIG. 1 as single elements. Such illustration is for ease of description and it should be recognized that the communication system 100 may include multiple additional implementations of the components, e.g., a device may be physically connected to the network 20 during selected periods of operation. In embodiments described herein below the device is connected to the network 20 via the communication satellite 30. The device 10 may be any device configured to execute computing functions and access the distributed computing environment as described herein below such as a mobile phone, desktop computer, or other computing device.

The network 20 is a series of points or nodes interconnected by communication paths and may be interconnected with other networks and contain sub networks. The most common topologies or general configurations of networks include bus, star and ring topologies. Networks can also be characterized in terms of spatial distance as local area networks (LANs), metropolitan area networks (MANs) and wide area networks (WANs). Various parts of the communication system 100 may be implemented by mobile components and may not be permanently attached to the network 20. For example, entities may interact with each other via a wireless connection using mobile components including components utilizing the radio communication towers 25. Embodiments of the present disclosure are usable with a number of networks, such as the global internetwork of networks referred to as the "Internet" and its variants (e.g., intranets, virtual nets, overlay networks and the like). Although the Internet will be used as the primary example in this disclosure, the disclosure herein may be used with other systems also including a private network, for example some point-of-sale ("POS") systems or in store retail systems, and therefore is not limited thereby.

The server 5 may be one of more embodiments of a computer including high-speed microcomputers, minicomputers or mainframes. The server 5 preferably executes database functions including storing and maintaining a database and processes requests from the workstation client 8 and/or device 10 to extract data from, or update, a database as described herein below. The server may additionally provide processing functions for the workstation client 8 and device 10.

The device 10 may be any type of communications or mobile computing device including e.g., a cellular phone, digital media player (e.g., audio or audio/video), personal digital assistant ("PDA") and a smart phone, which is a combination mobile telephone and handheld computer having PDA functionality. PDA functionality can comprise one or more of personal information management, database functions, word processing, spreadsheets, voice memo recording, location-based services, device backup and lock, media playing, Internet browsing, etc. and is configured to synchronize, publish/subscribe, download, or otherwise communicate personal information or user data (e.g., contacts, e-mail, calendar, notes, to-do list, web browser favorites, etc.) from one or more applications with a computer (e.g., desktop, laptop, server, etc.). Device device 10 is further configured to receive and operate additional applications provided to device 10 after manufacture, e.g., via wired or wireless download. A second device 11 is shown in FIG. 1 to illustrate satellite functionality with the radio communication tower 25 and the communication system 100.

The radio communication tower 25 may comprise any known point-to-multi-point wireless communications protocol and platform including cellular, e.g., 3G and 4G, and broadband wireless systems including, e.g., WiMax technologies, and may communicate over a wide spectrum of radio frequencies. One skilled in the art will readily appreciate that the disclosure described herein may be readily applied to various base-station and communications tower technologies, and is therefore not limited thereby. In one embodiment, the radio communication tower 25 is configured to communicate with the communications satellite 30.

In one embodiment, the communication satellite 30 is configured to provide positioning data and time information to enable the device 10 to resolve an approximate geographic location of the user, at a known resolution level associated with position and accuracy. The communication satellite 30 may additionally be configured to communicate with the radio communication tower 25 or with elements within the network 20. In one embodiment, the communication satellite 30 is configured to send GPS information to the device 10. For certain embodiments of the device 10 the communication satellite 30 may be used to route and handle communicates among devices. As described herein below, the communication satellite 30 may contain the server 5 and the resource management functions.

Figure 2:
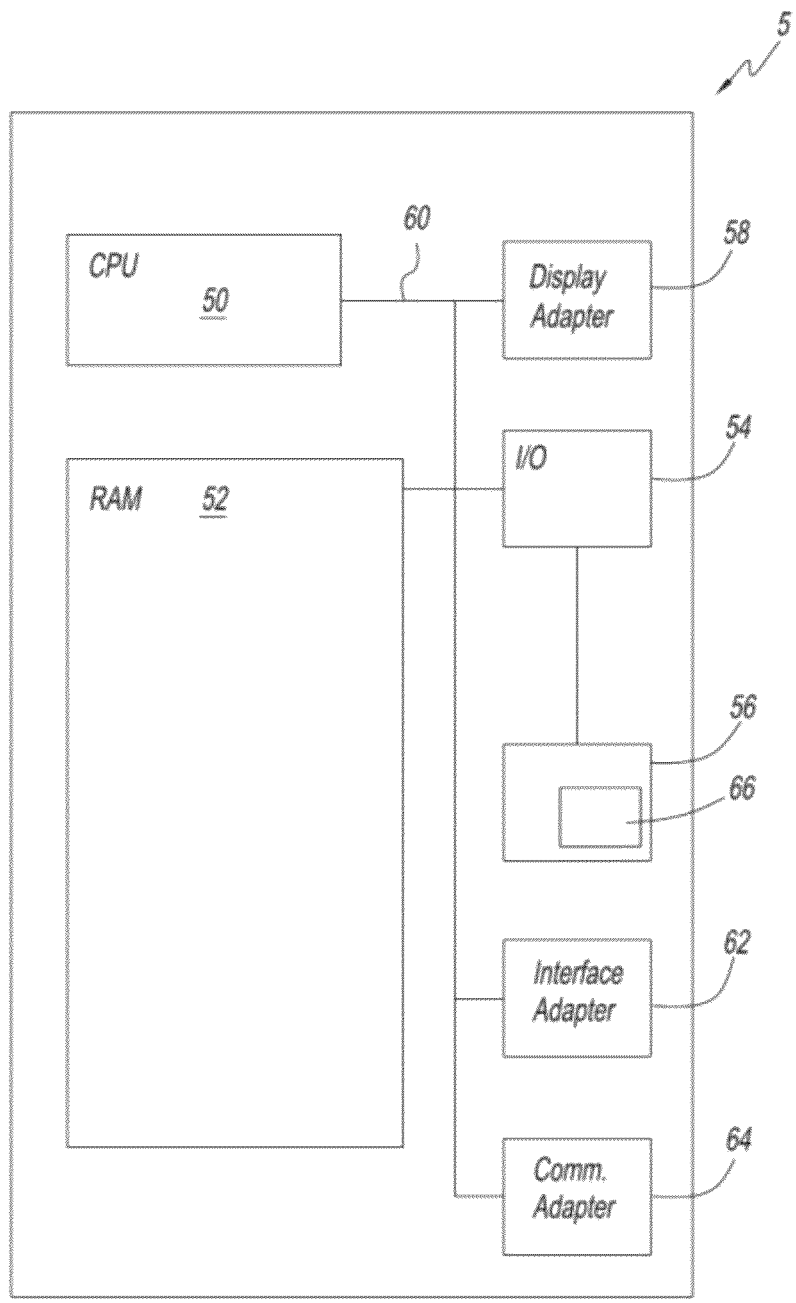
FIG. 2 schematically shows an exemplary embodiment of a server, in accordance with the present disclosure.

FIG. 2 schematically shows an exemplary embodiment of the server 5. As shown in FIG. 2, the server 5 includes a central processing unit (CPU) 50, random access memory (RAM) 52, input/output circuitry 54 for connecting peripheral devices such as a storage medium 56 to a system bus 60, a display adapter 58 for connecting the system bus 60 to a display device, a user interface adapter 62 for connecting user input devices such as a keyboard, a mouse, and/or a microphone, to the system bus 60, and a communication adapter 64 for connecting the server 5 to the network 20. In one embodiment, the communication adapter 64 is a wireless adapter configured for extraterrestrial communication such as in a communications satellite. The storage medium 56 is configured to store, access, and modify a database 66, and is preferably configured to store, access, and modify structured or unstructured databases for data including, for example, relational data, tabular data, audio/video data, and graphical data. One skilled in the art will recognize that embodiments of the server 5 can include additional components such as a high speed clock, analog to digital and digital to analog circuitry, and buffer circuitry and devices for appropriate signal conditioning. In one embodiment, the server 5 is housed or comprises a satellite communications system.

The central processing unit 50 is preferably a general-purpose microprocessor or central processing unit and has a set of control algorithms, comprising resident program instructions and calibrations stored in the memory 52 and executed to provide the desired functions. As one skilled in the art will recognize, the central processing unit 50 executes functions in accordance with any one of a number of operating systems including proprietary and open source system solutions. In one embodiment, an application program interface (API) is preferably executed by the operating system for computer applications to make requests of the operating system or other computer applications. The description of the central processing unit 50 is meant to be illustrative, and not restrictive to the disclosure, and those skilled in the art will appreciate that the disclosure may also be implemented on platforms and operating systems other than those mentioned.

Figure 3:
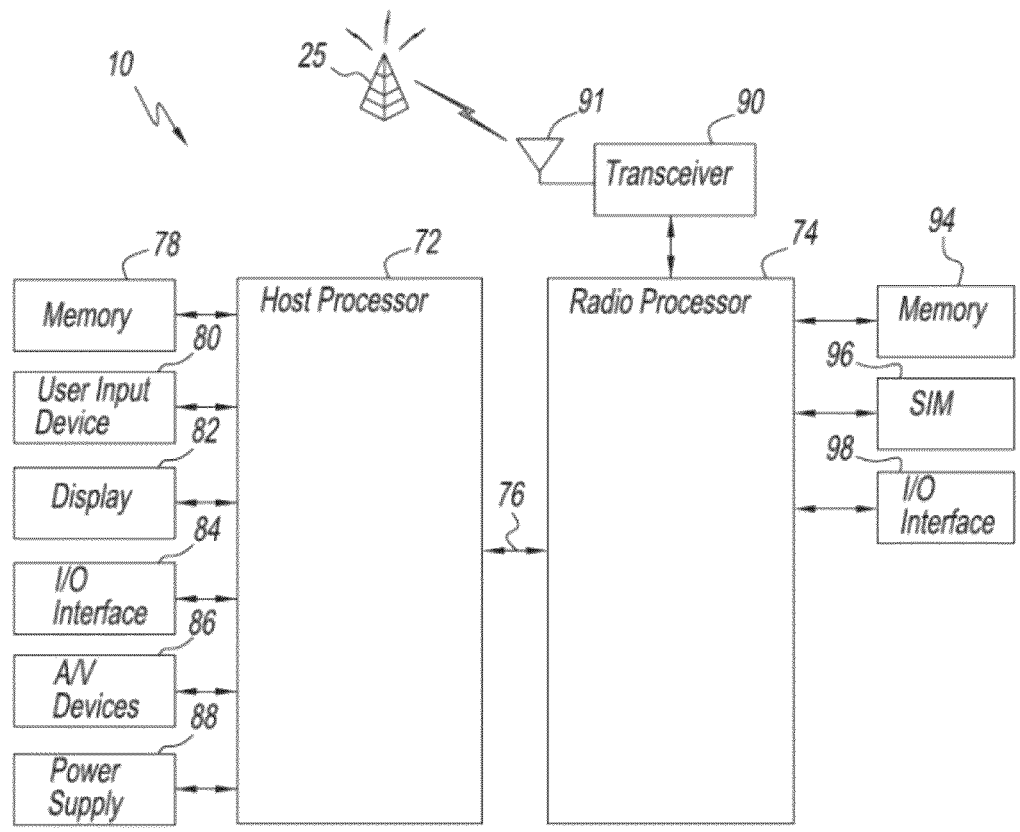
FIG. 3 schematically shows an exemplary embodiment of a device, in accordance with the present disclosure.

FIG. 3 schematically shows an exemplary embodiment of the device 10 configured to operate in a mobile environment. As shown in FIG. 3, the device 10 may include a dual processor architecture, including a host processor module 72 and a radio processor 74 (e.g., a base band processor or modem). The host processor module 72 and the radio processor 74 may be configured to communicate with each other using an interface 76 such as one or more universal serial bus ("USB") interfaces, micro-USB interfaces, universal asynchronous receiver-transmitter ("UART") interfaces, general purpose input/output ("GPIO") interfaces, control/status lines, control/data lines, shared memory, and so forth. The device 10 may additionally include any digital and/or analog circuit elements, comprising discrete and/or solid state components, suitable for use with the embodiments disclosed herein.

The host processor module 72 may be configured to execute various computer programs (e.g., software, firmware, or other code) such as application programs and system programs to provide computing and processing operations for the device 10. The radio processor 74 may be responsible for performing various voice and data communications operations for device 10 such as transmitting and receiving voice and data information over one or more wireless communications channels. Although the host processor module 72 and the radio processor 74 are shown and described as separate processors, such an illustration is for ease of description and it should be recognized that the functions performed by the host processor module 72 and the radio processor 74 may be combined in one processor, more than two processors, and may be implemented as a dual or multi-core chip with both host processor module 72 and radio processor 74 on a single chip. Alternatively, a single processor or multiple processors may perform the functions of host processor module 72 and radio processor 74, such as a single, unified processor that handles host and radio functions.

In various embodiments, host processor module 72 may be implemented as a host central processing unit ("CPU") using any suitable processor or logic device, such as a general purpose processor, or other processing device in alternative embodiments configured to provide processing or computing resources to device 10. For example, host processor module 72 may be responsible for executing various computer programs such as application programs and system programs to provide computing and processing operations for device 10. Examples of application programs may include, for example, a telephone application, voicemail application, e-mail application, instant message ("IM") application, short message service ("SMS") application, multimedia message service ("MMS") application, and web browser application. The application software may provide a graphical user interface ("GUI") to communicate information between device 10 and a user. The computer programs may be stored as firmware on a memory associated with processor 72, may be loaded by a manufacturer during a process of manufacturing device 10, and may be updated from time to time with new versions or software updates via wired or wireless communication.

System programs assist in the running of a computer system. System programs may be directly responsible for controlling, integrating, and managing the individual hardware components of the computer system. Examples of system programs may include, for example, an operating system, a kernel, device drivers, programming tools, utility programs, software libraries, an application programming interface ("API"), a GUI, and so forth. The device 10 may utilize any suitable proprietary or open source operating system in accordance with the described embodiments.

The memory module 78 is preferably coupled to the host processor module 72. In various embodiments, the memory module 78 may be configured to store one or more computer programs to be executed by the host processor module 72. The memory module 78 may be implemented using any machine-readable or computer-readable media capable of storing data such as volatile memory or non-volatile memory, removable or non-removable memory, erasable or non-erasable memory, writeable or re-writeable memory, and so forth. Although the memory module 78 is shown as being separate from the host processor module 72 for purposes of illustration, in various embodiments some portion or the entire memory module 78 may be included on the same integrated circuit as the host processor module 72. Alternatively, some portion or the entire memory module 78 may be disposed on an integrated circuit or other medium (e.g., hard disk drive) external to the integrated circuit of the host processor module 72.

A user input device 80 is preferably coupled to the host processor module 72. The user input device 80 may include, for example, an alphanumeric, numeric or QWERTY key layout and an integrated number dial pad. The device 10 also may include various keys, buttons, and switches such as, for example, input keys, preset and programmable hot keys, left and right action buttons, a navigation button such as a multi-directional navigation button, phone/send and power/end buttons, preset and programmable shortcut buttons, a volume rocker switch, a ringer on/off switch having a vibrate mode, a keypad and so forth.

The host processor module 72 is preferably coupled to a display device 82. The display device 82 may include any suitable visual interface for displaying content to a user of the device 10, such as a liquid crystal display ("LCD") such as a touch-sensitive color (e.g., 16-bit color) thin-film transistor ("TFT") LCD screen. In some embodiments, the touch-sensitive LCD may be used with a stylus and/or a handwriting recognizer program.

An I/O interface 84 is preferably coupled to the host processor module 72. The I/O interface 84 may include one or more I/O devices such as a serial connection port, an infrared port, integrated Bluetooth®, wireless capability, and/or integrated 802.11x (WiFi) wireless capability, to enable wired (e.g., USB cable) and/or wireless connection to a local computer system, such as the workstation client 8, or a remote computer system, such as the server 5. In one embodiment shown on a device 902 in FIG. 9, an external processing module 81 may interface through the I/O interface 84 to provide distributed computing services as described herein below. The external processing module 81 preferably includes a processing unit and a memory module configured to process distributed computing tasks.

Various audio/video ("A/V") devices 86 are preferably coupled to the host processor module 72. The A/V devices 86 support A/V capability of the device 10 including components such as, a microphone, one or more speakers, an audio port to connect an audio headset, an audio coder/decoder (codec), an audio player, a video codec, a video player, and so forth.

A power supply 88 configured to supply and manage power to components of device 10 is preferably coupled to the host processor module 72. In various exemplary embodiments, the power supply 88 may be implemented by a rechargeable battery, such as a removable and rechargeable lithium ion battery to provide direct current ("DC") power, and/or an alternating current ("AC") adapter to draw power from a standard AC main power supply.

As described herein above, the radio processor 74 may perform voice and/or data communication operations for the device 10. For example, the radio processor 74 may be configured to communicate voice information and/or data information over one or more assigned frequency bands of a wireless communication channel. The radio processor 74 may be implemented as a communications processor using any suitable processor or logic device, such as a modem processor or baseband processor. The radio processor 74 may include, or be implemented as, a digital signal processor ("DSP"), a media access control ("MAC") processor, or any other type of communications processor in accordance with the described embodiments. Memory 94 may be coupled to the radio processor 74. Although memory 94 is shown as being separate from and external to the radio processor 74 for purposes of illustration, in various embodiments some portion may be included on the same integrated circuit as the radio processor 74. Further, the host processor module 72 and the radio processor 74 may share a single memory.

The device 10 may include one or more transceivers 90 coupled to the radio processor 74, each transceiver 90 may be configured to communicate using a different types of protocol, communication ranges, operating power requirements, RF sub-bands, information types (e.g., voice or data), use scenarios, applications, and so forth. For example, the transceiver 90 may include a Wi-Fi transceiver and a cellular or WAN transceiver configured to operate simultaneously. The transceiver 90 may be implemented using one or more chips as desired for a given implementation. Although transceiver 90 is shown as being separate from and external to the radio processor 74 for purposes of illustration, in various embodiments some portion may be included on the same integrated circuit as the radio processor 74. The transceiver is preferably connected to an antenna 91 for transmitting or receiving electrical signals. As shown in FIG. 3, the antenna 91 may be coupled to the radio processor 74 through transceiver 90. The radio communication tower 25 is shown as an example of potential systems configured to receive and transmit signals from and to the antenna 91.

A SIM device 96 may be coupled to radio processor 74. The SIM device 96 may be implemented as a removable or non-removable smart card configured to encrypt voice and data transmissions and to store user-specific data for allowing a voice or data communications network to identify and authenticate the user. The SIM device 96 also may store data such as personal settings specific to the user.

An I/O interface 98 may be coupled to the radio processor 74. The I/O interface 98 may include one or more I/O devices to enable wired (e.g., serial, cable, etc.) and/or wireless (e.g., WiFi, short range, etc.) communication between the device 10 and one or more external computer systems.

The device 10 includes location or position determination capabilities. Device 10 may utilize one or more position determination techniques including, for example, GPS techniques, Cell Global Identity ("CGI") techniques, CGI including timing advance ("TA") techniques, Enhanced Forward Link Trilateration ("EFLT") techniques, Time Difference of Arrival ("TDOA") techniques, Angle of Arrival ("AOA") techniques, Advanced Forward Link Trilateration ("AFTL") techniques, Observed Time Difference of Arrival ("OTDOA"), Enhanced Observed Time Difference ("EOTD") techniques, Assisted GPS ("AGPS") techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), etc. Position determination techniques may be based on signals from one or more nearby cellular towers such as radio communication tower 25, one or more Wi-Fi access points (in which position is determined at least in part by collecting addresses of nearby wireless access points and comparing the addresses to a pre-stored database which associates addresses to geographic position), or other techniques. The device 10 can communicate location information upon determination, at various intervals, upon occurrence of trigger events, upon requests, or the like. For example, the device 10 can retrieve location information at the request of one or more network nodes and/or devices. By way of another example, the server 5 can use network elements to determine the location of the device 10 as described herein above.

Figure 4A:
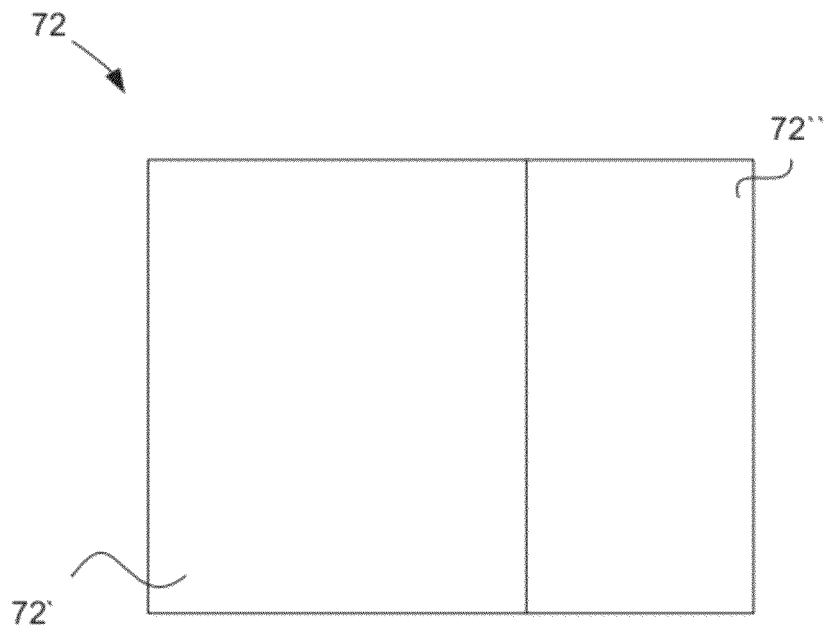
FIGS. 4A-4B show additional embodiments of a CPU module, respectively, in accordance with the present disclosure.
Figure 4B:
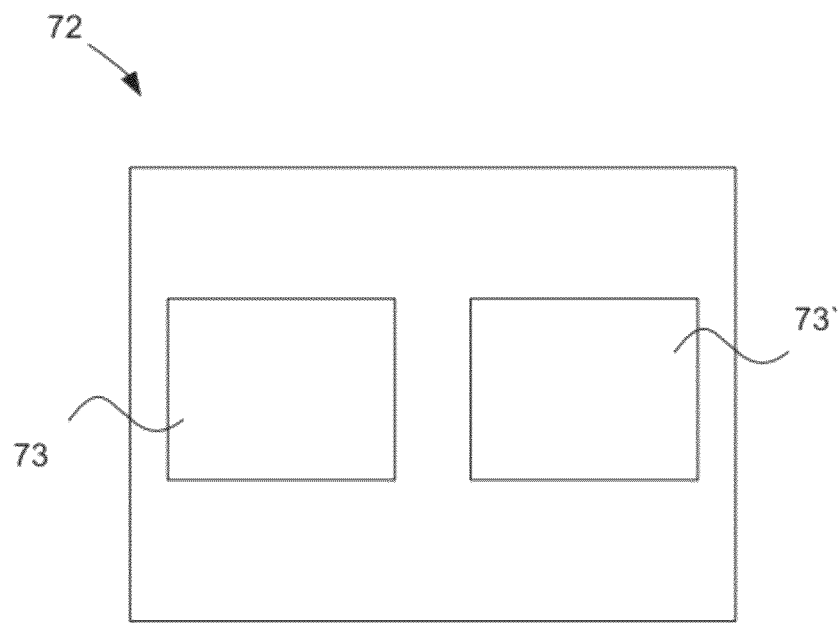

In various embodiments, the device 10 may include dedicated hardware circuits or structures, or a combination of dedicated hardware and associated software, to support position determination. For example, the transceiver 90 and the antenna 91 may include GPS receiver or transceiver hardware and one or more associated antennas coupled to the radio processor 74 to support position determination. Although the host processor module 72 is described herein above as a single CPU, multiple additional embodiments are contemplated by the disclosure including processing partitions an embodiment wherein the host processor module 72 includes a master CPU 72' and a sub-processor module 72" as shown in FIG. 4A and an embodiment wherein the host processor module 72 includes a first and a second processor module 73 and 73', respectively, as shown in FIG. 4B. The sub-processor module 72" and the second processor module 73' are configured to process distributed computing tasks, preferably exclusively.

Figure 5A:
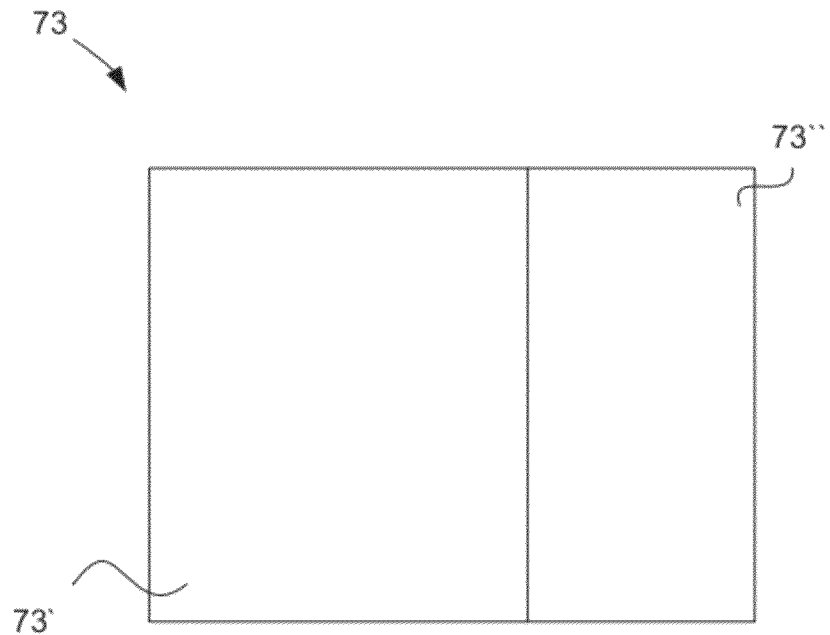
FIGS. 5A-5B show additional embodiments of a memory module, respectively, in accordance with the present disclosure.
Figure 5B:
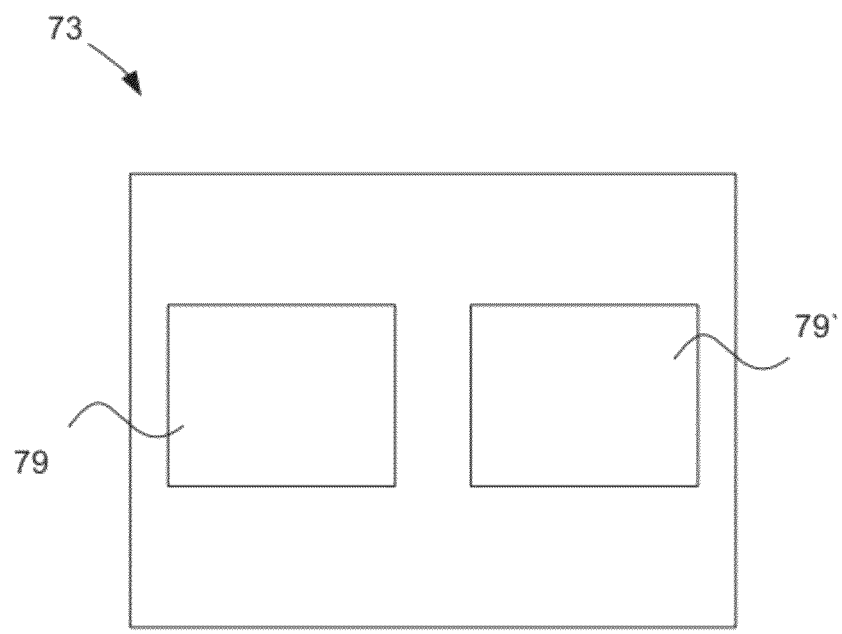

Although the memory module 78 is described herein above as an undivided component, multiple additional embodiments are contemplated by the disclosure including an embodiment wherein the memory module 78 includes a main memory module 78' and sub-memory module 78" as shown in FIG. 5A and an embodiment the memory module 78 includes a first and a second memory module 79 and 79', respectively, as shown in FIG. 5B. The sub-memory module 78" and the second memory module 79' are configured to process distributed computing tasks, preferably exclusively.

Figure 6:
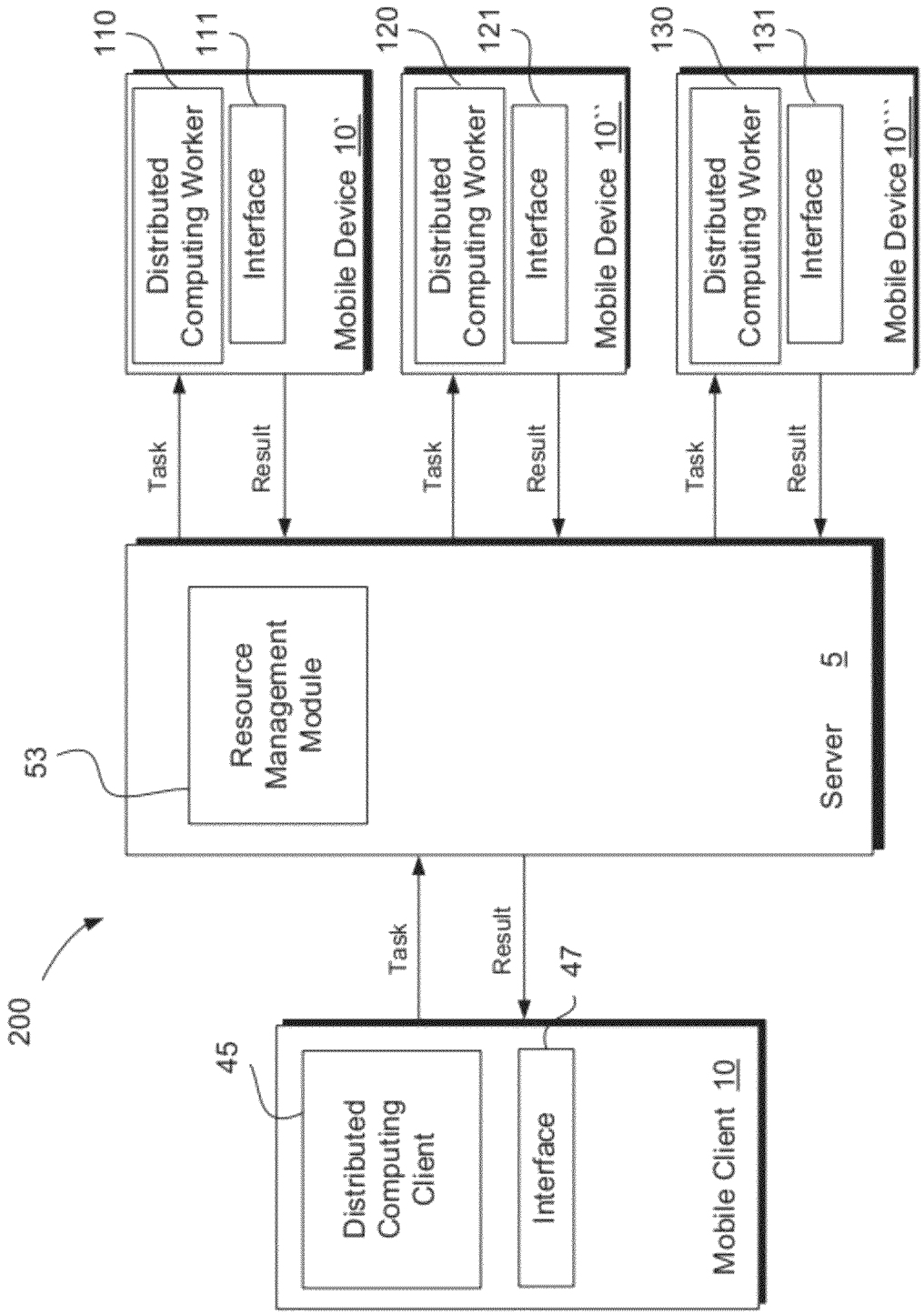
FIG. 6 shows a control scheme for distributing computing over the communication system, in accordance with the present disclosure.

FIG. 6 is a block diagram showing an exemplary distributed computing system 200 for distributing computing over the communication system. The distributed computing system 200 includes a distributed computing client 45 running on a device 10 in communications over a network communication channel to a server 5 on the network 20. The server 5 includes a resource management module 53. The resource management module 53 communicates over a network communication channel on the network 20 to the distributed computer workers 110, 120 and 130 on the devices 10', 10", and 10'". The distributed computing system 200 allows the distributed computing client 45 to use the computing resources that may be available from devices 10', 10" and 10'" on other devices to perform a computing project. The resulting saving of computational processes permits the device 10 to execute other software applications, or the distributed computing client 45 to perform other tasks.

The distributed computer workers 110, 120 and 130 may be available to the distributed computing client 45. When not performing a task from the distributed computing client 45, the distributed computer workers 110, 120 and 130 of the devices 10', 10" and 10'" can be executing other software programs, or the devices 10', 10" and 10'" can perform complex computing of tasks from other distributed computing clients. Those of ordinary skill in the art will appreciate that the system 200 is illustrative and the server 5 may serve for multiple clients and the device 10 may request services from multiple servers in other embodiments.

The distributed computing client 45 can be a computing software application that distributes computing tasks and manages client data. The distributed computing client 45 can be a custom software program or other software that accesses functionality via an interface, such as an application programming interface, or by other means. One ordinarily skilled in the art will appreciate the various combinations of client types that may access the functionality of the system. As one skilled in the art will readily recognize, the distributed computing client 45 may operate on multiple computing platforms in addition to mobile environments including, for example, desktop computing environments, server application, and laptop computer.

With an application programming interface (API) and/or programming language of the distributed computing client 45, functions can be defined representing a computing project to be executed by either a complex computing environment local to the device 10, or remote on a worker. The local complex computing environment may be part of the distributed computing client 45, or a device running on the device 10. The programming language includes mechanisms to define a job to be distributed to a complex computing environment and to communicate the job to the device on another device, or alternatively, on the device 10.

The distributed computer workers 110, 120 and 130 can be a computing software application or functions of a software application that perform complex computing of tasks, such as those tasks defined or created by the distributed computing client 45. The distributed computer workers 110, 120 and 130 can be a distributed computing application, module, service, software component, or a session, which includes support for complex computing of functions as defined by programming language of a distributed computing function. The distributed computer workers 110, 120 and 130 can include all the functionality and software components of the distributed computing client 45, or it can just include those software components it may need to perform complex computing of tasks it receives for execution. The distributed computer workers 110, 120 and 130 may have all or a portion of the software components installed on the devices 10', 10" and 10', or alternatively, accessible on another system in the network 20. The distributed computer workers 110, 120 and 130 are capable of performing complex computing of the task as if the distributed computing client 45 was performing the complex computing in its own complex computing environment.

The distributed computing device 10 includes an interface 47 that enables the resource management module 53 on the server 5 to communicate with the distributed computing client 45 on the device 10. The interface 47 establishes the communication channel between the distributed computing client 45 and the resource management module 53 so that the distributed computing client 45 is able to submit tasks to the resource management module 53 through the communication channel. In addition, the distributed computing device 10 also receives a result from the execution of the task through the communication channel established by the interface 47 between the distributed computing client 45 and the resource management module 53. One of ordinary skill in the art will appreciate that the interface 47 may be provided in the distributed computing client 45.

The devices 10', 10" and 10'" include interfaces 111, 121, and 131 that enable the resource management module 53 on the server 5 to interface with the distributed computer workers 110, 120 and 130 on the devices 10', 10" and 10'", respectively. The interfaces 111, 121, and 131 establish the communication channels between the resource management module 53 and the distributed computer workers 110, 120 and 130 so that the resource management module 53 is able to distribute the task to the distributed computer workers 110, 120 and 130 through the communication channels. In addition, the resource management module 53 may also receive the result from the execution of the tasks through the communication channels, although in some embodiments the result may be directly returned to the device 10.

Figure 7:
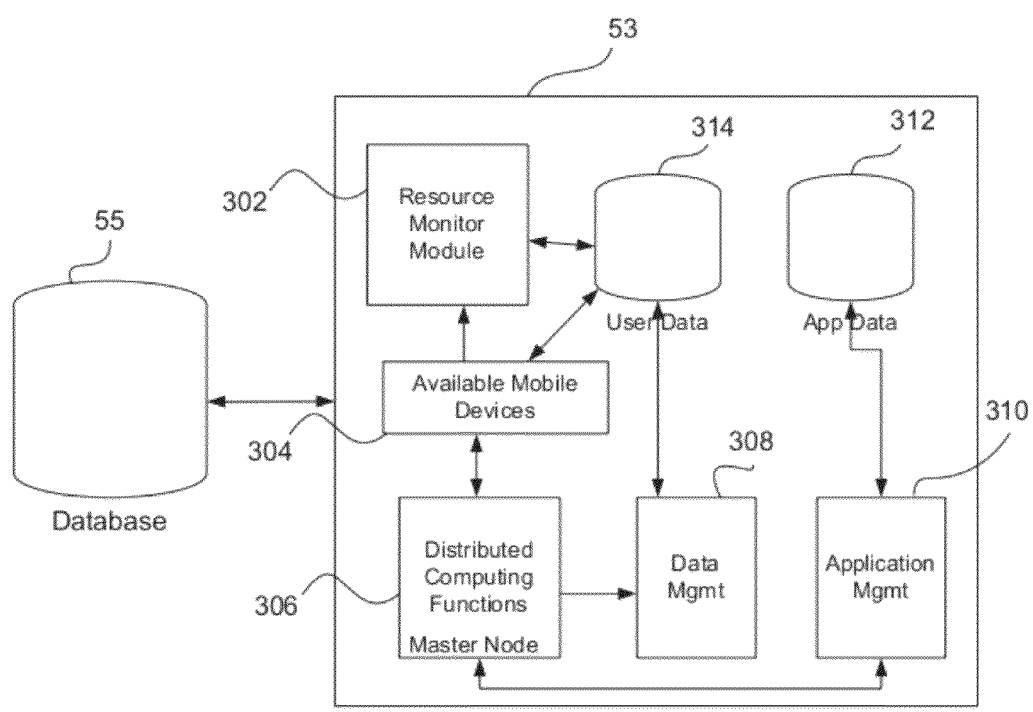
FIG. 7 shows a resource management module and a database of a server, in accordance with the present disclosure.

FIG. 7 shows the resource management module 53 and database 55 of the server 5. The resource management module 53 can be configured to manage user data, manage application data, monitor devices associated with the distributed computing system, and manage distributed computing functions including allocating resources by selection of devices for performance of a computing task. The resource management module 53 includes a resource monitor module 302, an availability module 304, a distributed computing functions module 306, a data management module 308, an application management module 310, an application database 312, and a user database 314.

The resource monitor module 302 monitors information associated with users of the distributed computing services such as device location and operating states of the device. Operating states of the devices can include information indicating whether the device is ON or OFF, an internal power supply level, available computational resources, signal strength, and connectivity to an external power source.

The resource monitor module 302 monitors physical locations of the devices for use in distributing computing tasks and performing distributed computing services. The device 10 determines the location using one or more of techniques described hereinabove and sends to the resource monitor module 302 via the server 5. In one embodiment, IP addresses, cell tower, and/or identified network may be used as an additional method for determining device location. The resource monitor module 302 preferably stores the location of the device along with an associated time-stamp in the user database 314.

The resource monitor module 302 additionally tracks and stores information associated with the physical location of the devices such as historical device reliability at the physical location, historical successful completion of assigned computing tasks for devices used at the physical location, and historical network disruption. The information may be indexed and utilized by an associated network used by the device 10. Cell tower information may be utilized in one embodiment as a replacement for determining a physical location. In one embodiment, physical location is used to select worker devices and construct the distributed computing "tree" as described herein below and route user requests to appropriate devices. The RMS can keep resource ratings on particular devices, track resources, routes requests to the appropriate devices from users, and contains rules for the data and application replication. Devices can also forward user requests to other devices containing all or some of the data of application the user is requesting.

The availability module 304 identifies devices that are available for distributed computing projects and/or data access and route user requests to some or all devices needed to satisfy a request. Devices can also forward to other devices. Operating states and physical location of devices, proximity to the requesting device, user participation preferences, and past performance metrics are used by the availability module 304. In one embodiment, the availability module 304 determines a "score" associated with a worker or server device with respect to a requesting device to identify preferred devices for providing distributed computing services. The score is determined based upon operating states, including e.g., resource availability, and physical location of devices, proximity to the requesting device, user participation preferences, and past performance metrics of potential worker devices. In one embodiment, the score is used to construct a distributed computing "tree" by the distributed computing functions module 306.

Physical location of devices are used to select worker devices and assign computing tasks. Physical location is used to determine proximity to the requesting device user. Devices in closer proximity to the user are more likely to have the same network characteristics, more likely to be in or move into a "hot zone" such as a "wifi" area, thus increasing bandwidth and processing efficiency. In embodiments utilizing a score metric to select worker devices and construct distributed computing trees more desirable scores, e.g., higher scores, are assigned based on proximity to the requesting device while less desirable scores are assigned to devices operated further away.

User participation preferences may be selected by users of the distributing computing system. The user participation preferences are used by the availability module 304 as participation enabling criteria. If any criterion is not met the user's device will be unavailable to process computing projects and/or access data sent from other devices. The user participation preferences, in one embodiment, are selectable monitored operating states. For example, one user participation preference may be based upon the battery power operating state. The user may select a predetermined battery power operating state for enabling processing of requested distributed computing processes.

For example, one participation enabling criterion can be a minimum available threshold of available computational resources. If the user is utilizing computational resources so that less than the minimum available threshold remains, then the device would be unavailable for distributed computing projects and/or data access. Another participation enabling criterion involves available battery power. When battery power recedes below a predetermined threshold set by a user, the user may select for the device to be unavailable for distributed computing projects and/or data access. Another participation enabling criterion may be whether the device is connected to an external power supply. For example, a user may select to only participate in the distributed computing environment when the mobile phone is connected to the external power supply. In one embodiment, users may also limit participation in the distributed computing environment. For example, users may set computational resource limits such that only a predetermined user selected percentage of total computational resources are used for distributed computing services.

The distributed computing functions module 306 utilizes devices identified by the availability module 304 as devices available for performing distributed computing tasks. The distributed computing functions module 306 via the resource management module 53 receives computational requests from a device via the distributed computing client 45 for processing and distribution over the network 20 utilizing a distributing computing tree. The distributed computing functions module 306 assigns and manages the distributive computing process including dividing computing projects into computing tasks and sub-tasks and monitoring responses from devices for compliance with predetermined fault parameters. The distributed computing functions module 306 additionally tracks and manages device location in the distribution tree and tracks which device is performing master-type computing function requests and the devices assigned worker-type computing functions. The distributed computing functions module 306 receives results of the requested task by way of the network 20 after processing by the worker device.

The distributed computing functions module 306 manages distributed computing process by serving as a "master node." Available devices are assigned locations in the distributing computing tree. In operation, the distributed computing functions module 306 selects a particular device, i.e., a worker device, to process a computing project from among the available devices operating distributed computing services, configured to access a distributed data set, and connected to the network 20. The distributed computing functions module 306 selects the device best suited to perform the computing project using criteria described herein above such as physical location of available devices and associated operating states of the devices. In one embodiment, the distributed computing functions module 306 utilizes past performance metrics to select devices. Location on a distributive computing tree may additionally be utilized by the distributed computing functions module 306 to assign computing projects.

Another enabling criterion the distributed computing functions module 306 may use to select a worker device may be based upon historical reliability and performance of a device to perform requested computing tasks. The resource manager 50 determines a device resource rating based upon historical network reliability associated with the device, network disruption, and historical completion of assigned computing tasks. Additional criteria can include metrics associated with a time or historical average time the device is plugged in for power usage purposes in the computing environment, and whether the device has an open and real time connection open with the server 5. In one embodiment, if the rating is less than a predetermined threshold, the device is not selected to process the computing task.

The data management module 308 manages user and system data including tracking the devices that store data for users of the distributed computing services. The data management module 308 is configured to access and modify data stored in the user database 314. In one embodiment, the data management module 308 interfaces with the distributed computing functions module 306 to perform master node distributed database management. For split data sets and unanimous data structures, the data management module 308 stores and manages data location and associated device. Redundancy and backup mechanisms are contemplated by this disclosure including those managed from the server 5 such as using the user database 314 and database redundancy replicated over multiple devices for user data, applications, and application data, for example.

User data and applications may be secured using one of multiple techniques. Preferably, server firewalls will prevent data and applications from access by unauthorized users, via system firmware in the device or other means. In one embodiment, user data and applications are indexed by ESN and device specific encryption. In one embodiment, each device configured to operate in the distributed computing environment includes an encryption chip configured to encrypt the data when stored in the database and decrypt it when the data is needed for the system to do its computing of the application. Encryption techniques may additionally be utilized when storing and transferring data and applications secured and stored over multiple devices.

The application management module 310 manages application and computing functions associated therewith. Applications and associated computing functions may be stored in the application database 312 and distributed similar to data in the system. Computing functions of the applications may be replicated over multiple devices for additional subsequent replication and backup. The application management module 310 stores information identifying particular devices that store computing functions associated with the applications.

Functions of the server 5 and resource management module 53 may, in one embodiment, be virtualized by designating one or multiple roaming devices to perform functions of the resource management module 53. In this embodiment, applications and data are replicated to multiple devices for redundancy, backup, and for computational efficiency. In this embodiment, the multiple devices may act as master node for the distributed computing functions and to manage and track data and applications.

Figure 8:
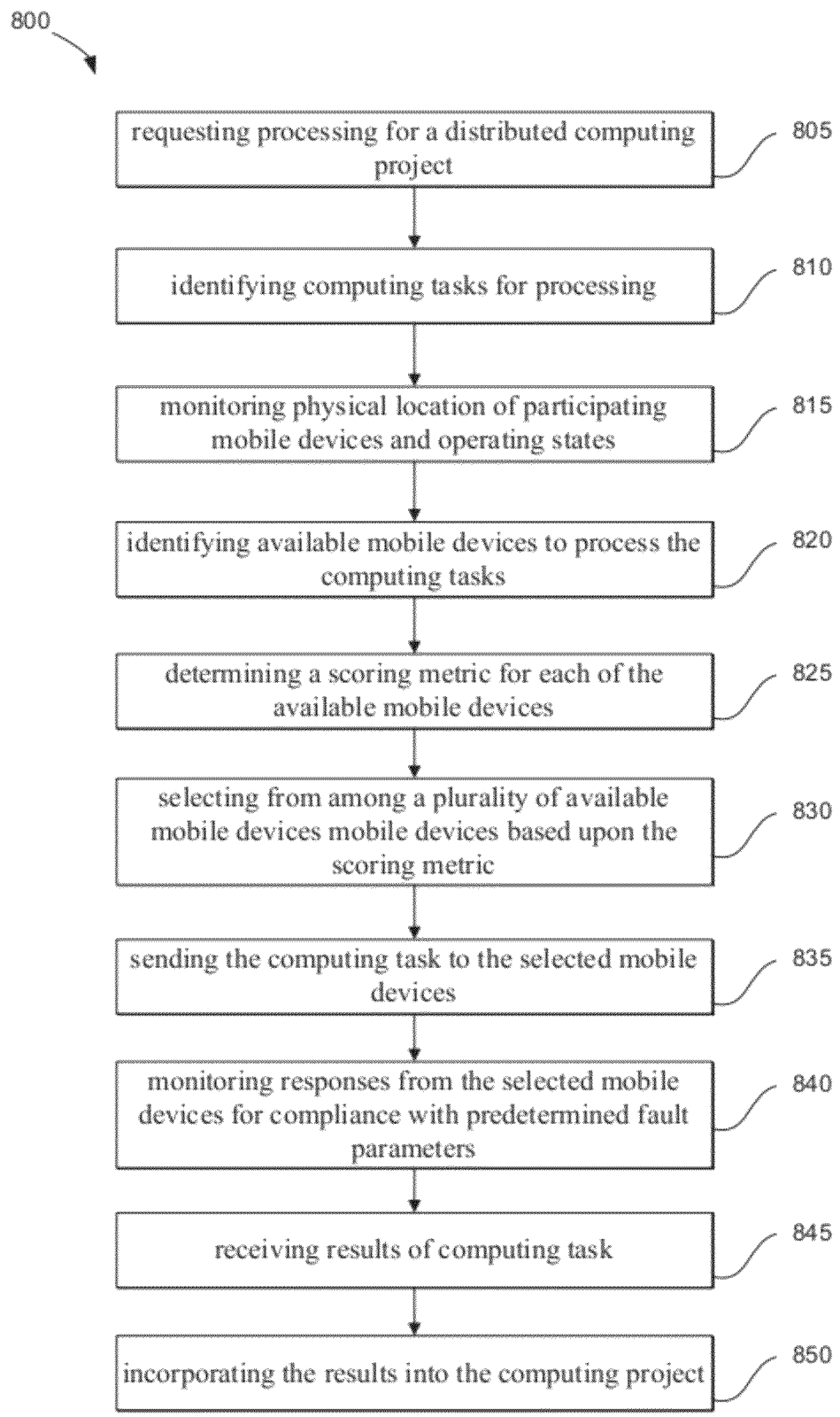
FIG. 8 shows a control scheme for distributed computing of computing tasks using available computing power of devices, in accordance with the present disclosure.

FIG. 8 shows a control scheme 800 for distributed computing of computing tasks, in accordance with an embodiment of the disclosure. Although the control scheme 800 is shown for distribution and return of a single computing task. One skilled in the art will recognize that multiple additional tasks may be performed in parallel and concurrent with the illustrated task including computing tasks requested from multiple devices. The control scheme 800 is shown as discrete elements, such an illustration is for ease of description and it should be recognized that the functions performed by the control scheme 800 may be combined in one or more devices, e.g., implemented in software, hardware, and/or application-specific integrated circuitry (ASIC). For example, the control scheme 800 may be implemented in software or operating systems of devices to participate in distributed computing services.

The control scheme is configured, in one exemplary implementation, to provide distributed computing services to participating devices such as the device 10 or a desktop configuration. In operation, a device requests that a distributed computing project be processed by another device by sending a request 805 to the server 5. The computing project may include computing processing, data uploading, and/or data downloading. The request from the device may originate from an executed application or other computing function configured for distributed computing services such as an internet browser. In one embodiment, there is a time-based initiation and confirmation on communications to the resource management module 53 to authenticate device users operating in the distributed computing environment. The server 5 identifies computing tasks for processing which are portions of a computing project 810. For example, the computing project may request a file be downloaded and delivered to a requesting device. One task of the computing project may include downloading a first portion of the file from a first identified device. As described herein above, application and user data may reside on one or more devices including the server 5.

The resource management module 53 monitors physical location of participating devices and operating states 815. The resource management module 53 identifies available devices to process the computing tasks 820. Availability may be dependent upon enabling criteria such as having a sufficient computing function or application for processing the computing task. The resource management module 53 determines a scoring metric for each of the available devices to determine which devices are best positioned to process the available task 825. The scoring metric is preferably based upon physical location of the available devices and at least one operating state associated with the corresponding device. In one embodiment, the scoring metric is based upon historical performance metrics associated with a device and historical performance metrics associated with physical locations. Availability and storage of user data and application information is additionally factored into the scoring metric.

The resource management module 53 selects from among a plurality of available devices associated with a highest scoring metric 830. Alternatively, the devices may be selected as described herein above using device location and at least one associated operating state of the device. The resource management module 53 sends the computing task to the selected devices 835 and monitors responses from the selected device for compliance with predetermined fault parameters 840. In an embodiment wherein devices may be configured to sub-divide tasks to devices proximately located, using, e.g., peer-to-peer communication capabilities, devices assigned tasks may further distribute and divide computing tasks. After processing the task, the server 5 receives results of computing task from the selected device 845 and the resource management module 53 incorporates the results into the computing project 850.

In one exemplary application, a requesting device uploads a web-site or computer program via the distributed computing services. The server 5 receives the web-site or computer program and distributes computing functions and data associated with the web-site or computer program to participating devices. Application locations are managed by the application management module 310, and associated data is stored in the application database 312. In one embodiment, the server provides a web-site configured to receive user content, data, and applications for replication and distribution throughout the distributed computing environment. In operation, users may access the web-site requesting resources provided by participants of the distributed computing environment. In one embodiment, applications and associated computing functions upload to the distributed computing environment are accessible only by participating users of the distributed computing environment.

A web-site, including user-defined content such as web pages and associated data could reside on multiple devices, computing devices, and/or communications satellite 30. In operation, users requesting web page access would receive content delivered via the devices to the requesting device. When users request web pages the server 5 via the resource management module 53 requests the associated content from a device storing the data. The device storing the data returns the data to the requesting device via the network 20. The request is routed to the appropriate device(s) through the resource management server or other devices in the distributed computing network. Further, the server 5 can direct requesting devices to the worker devices for direct communication and computing processing. For example, if a user, with their device which is a part of the distributed computing environment, were at a gas station configured to participate in the distributed computing environment, the server 5 could directly point the user to the participating device at the gas station to perform computing functions such as pay for fuel, track fueling statistics, account administration, etc.

Figure 9:
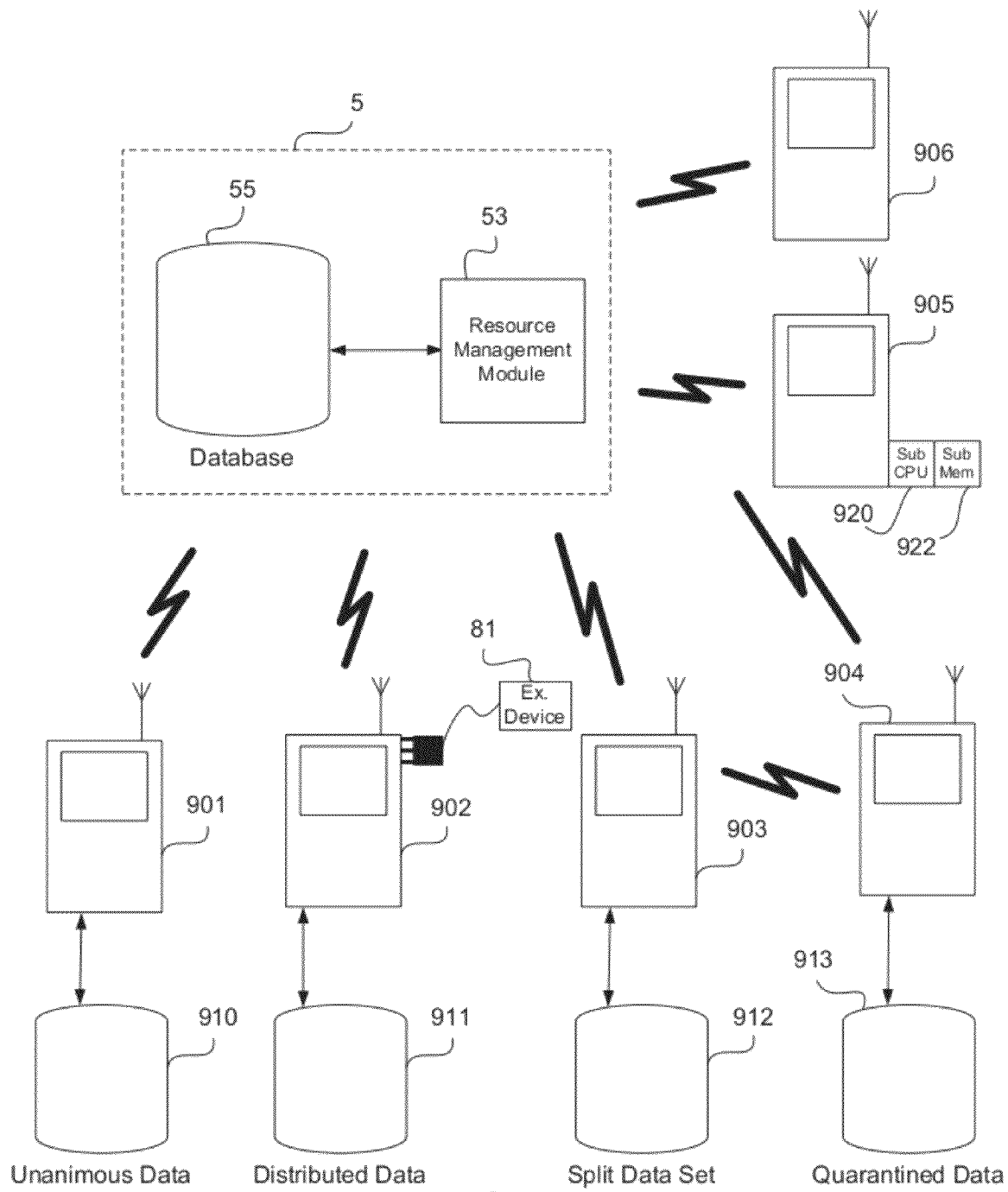
FIG. 9 shows an exemplary implementation of the resource management module interacting with a plurality of devices, in accordance with the present disclosure.

FIG. 9 shows an exemplary implementation of the resource management module 53 interacting with a plurality of devices 10. As shown in FIG. 9, multiple devices 901, 902, 903, 904, 905, and 906 may be communicatively connected to the server 5 and managed by the resource management module 53. Additionally, multiple exemplary embodiments of databases 910, 911, 912, and 913 are shown paired to a device. The disclosure herein contemplates multiple database arrangements may be implemented on any single device and multiple variations of database arrangements may be implemented in the distributed computing environment. For example, unanimous data and distributed data may be stored in a single device. Additionally, as described herein above, the server 5 may be implemented in the communications satellite 30.

As described herein above, applications can be installed on the devices and associated data stored. As shown on a first device 910 in FIG. 9, data stored in a database on the device 910 can be unanimous. The second device 902 includes distributed data stored in the second database 911. The distributed data, as described herein above is distributed among many devices in the distributed computing environment. A third device 903 includes a third exemplary database 912 for split data sets. The fourth device 904 includes a fourth exemplary database 913 including quarantined data for prohibiting unauthorized access. A fifth device 905 includes a second CPU module 920 and a second memory module 922 for performing distributed computing services.

In operation, the devices respond to user requests for applications, web sites/pages and/or data. User requests for an application can be routed to the correct devices by the resource management server and/or the devices themselves. For example, the third device 903 is configured to send computing and data requests to neighboring device such as the fourth device 904 shown in FIG. 9. The fourth device 904 may process the request, send the request to a second device, or route the request to the server 5. Multiple routing from the resource management module 53 or device-to-device routing could be used if a device is not available or the device where the original user request was routed only contains a portion of the application or data needed to fulfill the user request. In one embodiment of the distributed computing environment, delay-tolerant network functionalities are utilized to transmit and receive requested data. The delay-tolerant network transmits packetized data over multiple hops or network nodes. In the delay-tolerant network a complete end-to-end path of a transmission does not have to be active at a given moment for transmission to occur. Rather than relying on the ability to rapidly transmit packets back and forth across a data path, a delay tolerant network opportunistically moves an entire semantic chunk of data (e.g., a file) one hop at a time, as nodes become available, in a store-and-forward manner. For example, data may travel in a chain or path that the user request follows going from device to device accessing the portions of the application or data that is needed to fulfill the user's request from an application.

In another networking embodiment, for increased speed and high availability request(s), and for application and data access, the resource management module 53 could also utilize multicast networking. Multicast networking is the use of multiple paths and multiple options to fulfill a user request with multiple devices. If one path should fail or experience latency, there would be another path to another device that could fulfill the user request of an application or data. If the user is requesting access or a download of data, the same path would exist as described. The data would be transferred directly or from one device to another (along a path) being stored on the receiving device until the next device has fully received all the data. By holding on to the data, this ensures that the data request reaches the destination as it goes from a first device to a second device such as the device. In a preferred embodiment, the transmission of information from device to device is encrypted and requires an authentication key that would change with each interaction between devices. This could be managed internally on the devices or through the resource management module 53. Preferably, data is authenticated for each hop between devices ensuring data integrity during the transmission between devices.

Data stored on each device is preferably encrypted when stored on the device to prevent unauthorized access. In one embodiment, data and application information transferred to a first device for subsequent transfer to second device may be stored on the first device and managed by the resource management module 53, i.e., a replication of the application and data. The stored data and application information may then be accessible to other devices and users as appropriate. The physical location of the device and data or application on the device, for routing and access purposes, is managed by the resource management module 53 or internally on the device.

In one embodiment, each interaction between devices and/or the resource management module 53 requires an authentication key that preferably changes with each interaction. Each device in the mobile computing environment also has its own encryption key specific to each device. The system could also do a one-time authentication when the device first accesses the distributed computing environment. The device may be configured to require a password that a user may enter on the device when accessing user specific data and application information. Another security measure could be that the applications and data can only be accessed when logged into a predetermined network such a wireless carrier's network. Devices may be configured to require additional user authentication such as a fingerprint, voice recognition, or retinal authentication.

In one exemplary embodiment, initiation of a users request or linking from device to device could employ QR codes or other known identification method. In one exemplary application, a QR code at a gas station may be utilized to identify a gas pump and associated financial institution. A device equipped with camera capabilities may be utilized to visual capture the QR code on the gas pump. The user's device contains the user's financial information. The distributed computing environment routes a payment request through nodes, which may include obtaining authorization from a bank and the merchants bank, then to a financial institution associated with the gas station to deposit funds for payment on the gas. Data may additionally be routed back to the device and gas station to complete the transaction and/or authenticate the charges.

In one embodiment, a user may access the distributed mobile computing environment using a terminal device. The terminal device may utilize a projector configured to display user input information to enable a user to input selected information to the server 5. In this embodiment, a user may type on a screen or touch the screen to activate and manipulate objects and information such as moving a file from one folder to another. The terminal device may be utilized, in one embodiment, by passcode delivered via user input or via a hardware application such as a flash drive, or a unique device configured to plug into a configured terminal device. For example, a key chain configured with the unique device may be configured to plug in to this terminal device (with only keyboard and screen). Security features may be added such as fingerprint authentication. Once enable, a unique authentication code is generated for that session only (which can never be duplicated or used again). This authentication codes permits access to the distributed computing environment and associated features as described herein above.

Figure 10:
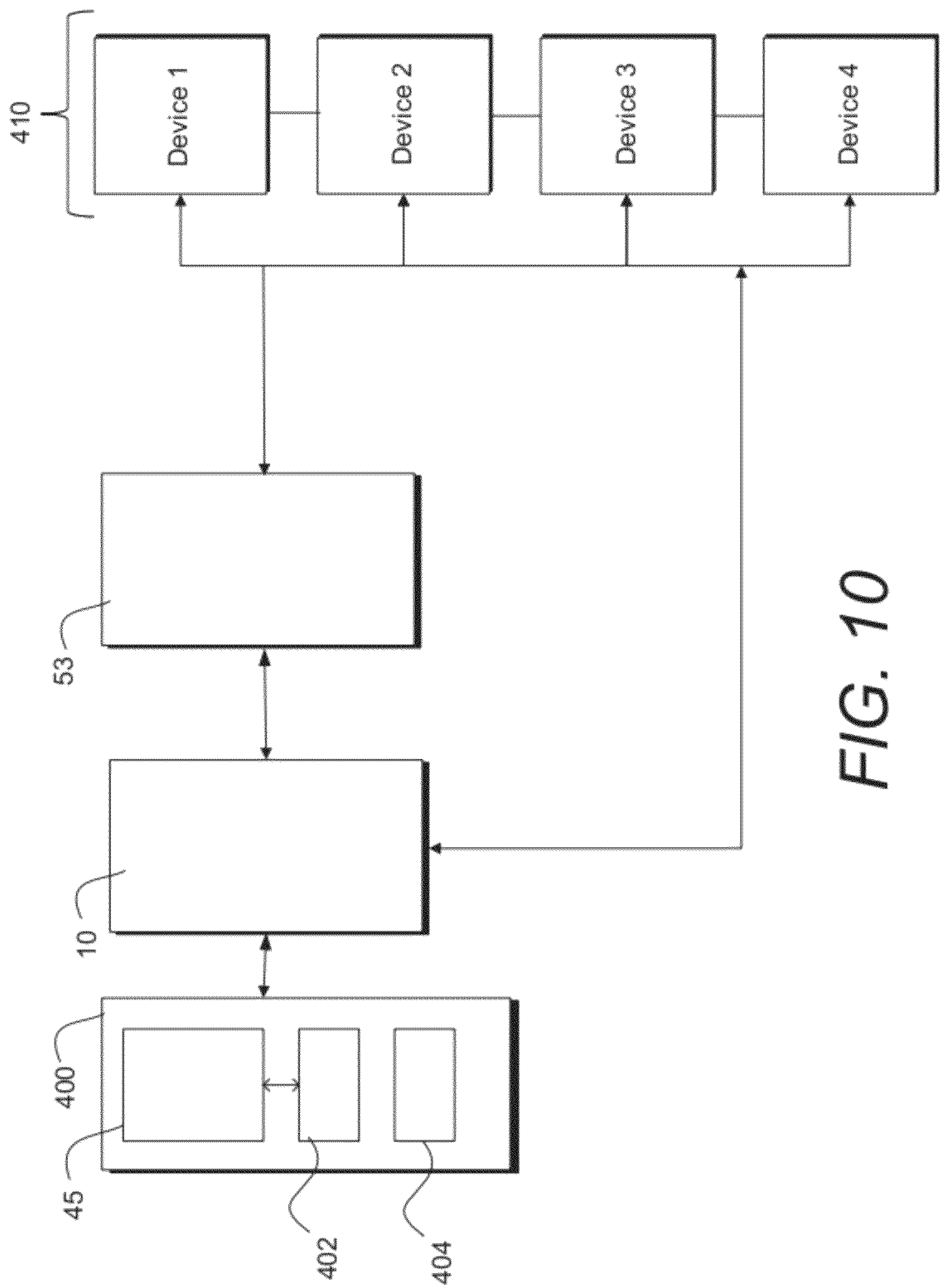
FIG. 10 graphically shows informational flow among devices in network described herein above utilizing a distributed computing scheme, in accordance with the present disclosure.

FIG. 10 graphically shows informational flow among devices in network described herein above utilizing a distributed computing scheme. In one embodiment the distributed computing scheme utilizes function described and shown with respect to FIG. 8. As shown in FIG. 10, the device 400 is communicatively connected to a mobile device 10 although, as described herein above, the device 400 may be connected to any computing device configured for network communication and data storage and retrieval. The exemplary devices 410 may be any number and type of computing device including, e.g., a server, desktop computer, satellite, and mobile device.

A first device 400 is an external computing module configured to communicate with a mobile device 10, for example, via a USB connection. One skilled in the art will readily appreciate that the first device 400 may be connected to any one of a number of computing devices, including mobile and stationary computing devices. In one embodiment, the device 400 includes the distributed computing client 45, a memory module 402, and a processor. In one embodiment, the device 400 includes a user authentication device 404. The user authentication device 404 may be a fingerprint scanner, an iris scanner, or any biosecurity authentication device. The device 400 may include a tangible computer-readable medium configured to store instructions related to or requested by the distributed computing client 45, executable by a digital processing apparatus. The mobile device 10 is selectively, communicatively connected to the resource management module 53 as described herein above.

When a user of the mobile device 10 executes a function that requires data retrieval, the mobile device 10 communicates with the device 400, the resource management module 53, and a plurality of computing device such as the exemplary devices 410. Once the mobile device 10 determines that remote data is required or desired by a user, the mobile device 10 requests authentication of the user by the resource management module 53. Authentication of the user is made by the resource management module 53 using information obtained by the device 400 such as username, password, fingerprint or thumbprint, voice recognition and/or retina scan. Information transmitted to the resource management module 53 is preferably encrypted.

Upon authentication, the resource management module 53 returns a one-time user session (OTUS) access code to the device 400 via the mobile device 10. Upon receiving the OTUS, the user is able to request and retrieve data over the distributed network. The data request is validated using the OTUS. The resource management module 53 returns a one-time-code (OTC) for accessing data stored over the network on any number of computing devices 410 and returns a location code corresponding to a device address for locating the device on the distributed network. In one embodiment, the resource management module 53 communicates the OTC to devices that have data associated with the user's data retrieval request prior to sending to the mobile device 10. In one embodiment, the OTC can be assigned on a rolling or hopping basis wherein the computing devices are assigned an OTC associated with a particular device prior to the mobile device 10 requesting the OTC from the resource management module 53. Upon receiving the OTC from the mobile device 10, the devices authenticate the request by comparing the OTC from the mobile device 10 to the OTC from the resource management module 53. If authenticated, the devices execute the request and send the data. Data may be sent through the resource management module 53. After using the OTC to retrieve a batch of data, the OTC code is no longer useable. After ending a session by logging off or upon expiration of a predetermined time period, the OTUS expires requiring a user to re-login and authenticate with the resource management module 53 to issue a new OTUS.

In one exemplary situation, a user is operating a remote executed application over the distributed network. The application may require access to remote stored data stored over the distributed network. As described herein above the user acquires an OTUS and sends a request to the resource management module 53. The resource management module 53 returns an OTC to the mobile device 10 and sends the OTC to the devices 410 having stored data associated with the user's request. Upon appropriate handshaking of the OTC codes, data is retrieved by the devices 410 and transmitted to the mobile device 10, preferably encrypted. The process is similarly executed for user requests and routines desiring data manipulation such as new data storage. New data locations are stored on the device 400 along with the resource management module 53 as described herein above.

If a user requests that data be erased an OTC is returned by the resource management module 53 with locations to erase data among device(s) 410, the resource management module 53 may delete data and data locational information and device(s) 410 can delete it directly. The request is transmitted through the resource management module 53 or transmitted directly to device to save or erase data. Upon successful execution of the request, the device(s) 410 notify the resource management module 53 regarding status of the request, e.g., success, or failure. In one embodiment, after a user logs off, data associated with a user is synchronized over the network for redundancy and backup purposes. The resource management module 53 preferably calculates devices and locations where backup data can reside and saves it there, preferably on one or more devices/satellites. The resource management module 53 is additionally configured to delete copies or backups of the data saved in the server 5.

Communications between devices within the distributed network preferably include a communication protocol having transmission code correspond to the OTUS, the OTC, a device location, data location on the device, and any required application access security keys. In one embodiment, a unique user ID and/or device ID such as a MAC address is included in the communication protocol. In one exemplary embodiment the first 16 bits of a transmission correspond to the OTUS, the next 16 bits correspond to the OTC, the next 16 bits correspond to the device location, and the following 16 bits correspond to data location on the device. Null strings may be sent to indicate beginning and ending transmissions and to indicate application access security keys.

Figure 11:
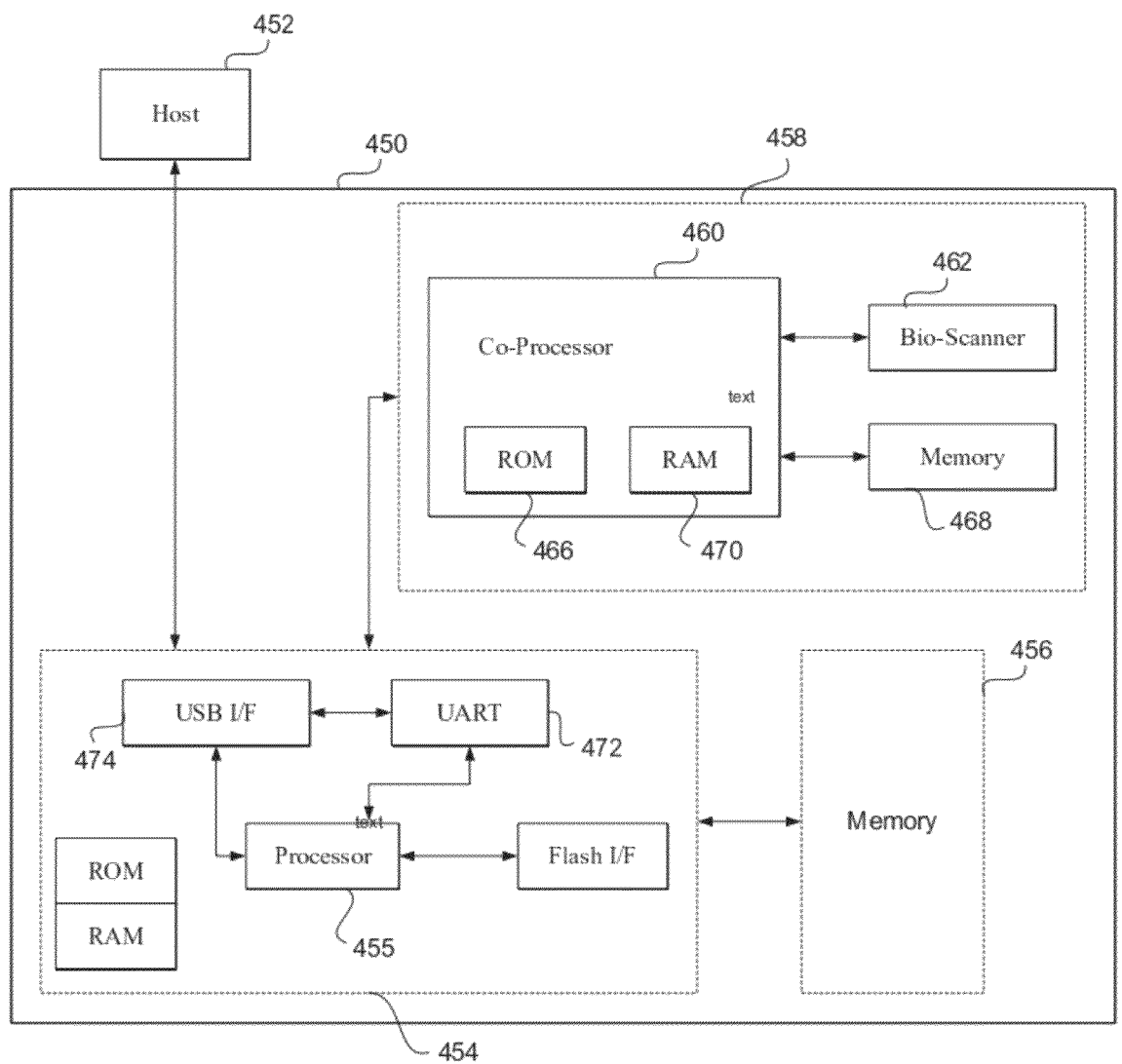
FIG. 11 schematically shows an exemplary embodiment of an external processing module, in accordance with the present disclosure.

Referring now to FIG. 11, there is shown a block diagram of functional components of the external processing module 81 coupled to an exemplary host device 452. The external processing module 81 in general includes an integrated circuit 454, memory 456 and a biometric scanner system 458. The integrated circuit 54 may be implemented as an application-specific integrated circuit (ASIC), but may be implemented as other types of integrated circuits. Some portion of the functions performed by ASIC 454 may also be implemented in software. The memory 456 may be any of a variety of semiconductor, non-volatile memories, such as for example a flash memory system.

The biometric scanner system 458 includes an authentication coprocessor 460 and a biometric scanner 462. The coprocessor and scanner cooperate to accept and authenticate biometric data as explained in greater detail hereinafter. In embodiments of the invention, the biometric scanner system is of the type to accept fingerprints and/or thumbprints. However, it is understood that biometric scanner system 58 may be of the type to accept other unique personal identifier data, including but not limited to a retina scanner and a voice print identification device.

In embodiments of the invention, scanner 462 may be a silicon-based capacitive fingerprint/thumbprint sensor. In general, scanner 462 is comprised of a two-dimensional array of capacitive sensing cells, each containing an active capacitive feedback circuit whose effective feedback capacitance is modulated by the presence of live skin close to the surface of the sensor. When live skin is brought in close proximity to a sensor cell, the skin interferes with electric field lines within the cell and reduces the effective capacitance. When the skin is on the sensor surface (fingerprint ridge) the feedback capacitance is minimized, while when the skin is far from the sensor surface (fingerprint valley) the feedback capacitance is maximized.

This difference in capacitance (presence or absence of skin) can be measured for each cell in the two-dimensional array to capture the entire print image. The output of the sensor array may be passed through an analog signal-conditioning block providing the capability to adjust sensor gain and offset before the signal is converted through an on-chip A/D converter into an 8-bit digital signal for encryption and storage as explained hereinafter. It is understood that the above method of obtaining biometric data is by way of example only, and those of skill in the art would appreciate other devices and methods may be used for obtaining a digital signal of biometric data.

In embodiments of the device, all storage of scanned biometric data and comparison against input biometric data are performed within the biometric scanner system 458. In particular, authentication coprocessor 460 may have associated ROM 466 having software for executing initialization of biometric scanner system, and comparison of biometric data within the biometric scanner. The authentication coprocessor 460 may also have non-volatile memory 468 for storing encrypted reference pattern(s) of biometric data as explained hereinafter. Non-volatile memory 468 may be a flash memory similar to flash memory 56 described above. In alternative embodiments, the non-volatile memory 468 may be omitted, and the encrypted biometric data reference pattern(s) may be stored in a reserved area within flash memory 456. The coprocessor 460 may further include RAM 470 for temporarily storing the biometric data reference pattern(s) and scanned biometric data during a comparison for verification of a user. In one embodiment, the storage of scanned biometric data is performed in the distributed computing environment.

Once device 481 is coupled to a host 452, initialization, or "pass-through," firmware on ROM 466 initializes the coprocessor 460 and the coprocessor 460 communicates with host 452 preferably via universal asynchronous receiver-transmitter (UART) 472 and universal serial bus (USB) device interface 474 on ASIC 454. UART 472 is a known interface component that handles asynchronous serial communication between the biometric scanner system 458 and ASIC 454. Embodiments of the present invention use a USB connection to the host device. The host may include a USB host controller and a USB port for receiving a USB connector of the device 81 as explained hereinafter.

The disclosure is not limited to USB connections, and other connections are contemplated by the disclosure herein. Moreover, it is understood that ASIC 454 may include additional known components in alternative embodiments of the device.

Further still, while the storage and comparison of entered and stored biometric data has been described above as being performed by coprocessor 460, it is understood that these operations may be carried out by processor 455 on ASIC 454, or within host device 452, in alternative embodiments. In embodiments, power for the device 81 is received from the host 52 via the USB connection. However, the device 81 may include an independent onboard power supply in alternative embodiments.

Figure 12:
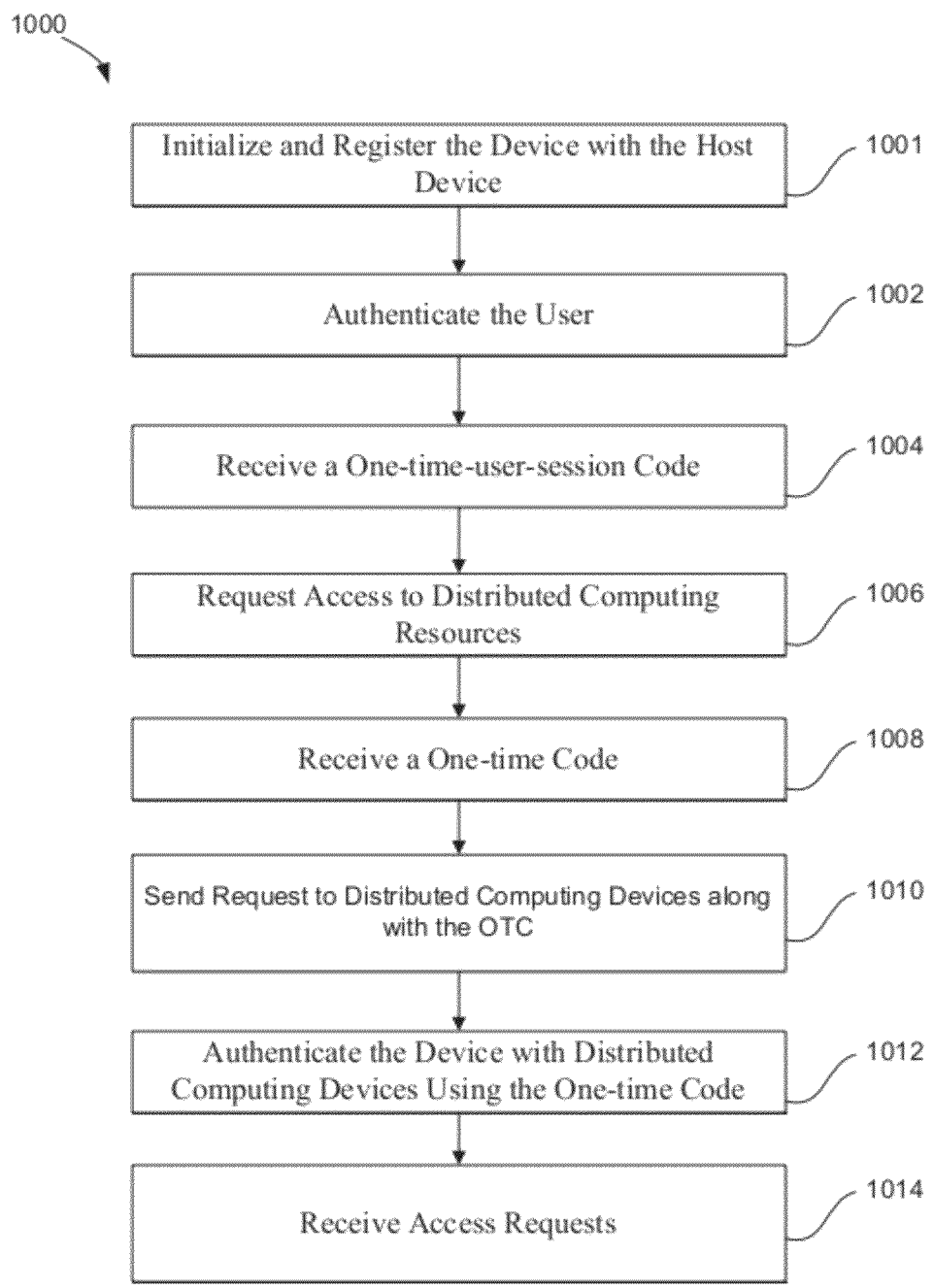
FIG. 12 shows a control scheme for distributed computing of computing tasks using available computing power of devices utilizing the external processing module, in accordance with the present disclosure.

An embodiment of the operation of the biometric scanner device to allow only authorized access to memory 456 will now be described with reference to the flowchart 1000 of FIG. 12. The firmware in ROM 466 checks to see whether the device 81 has been connected to the USB port of the host device. Upon being coupled to a host platform, portable device 81 undergoes an initialization procedure (step 1001). In embodiments, the initialization procedure involves establishing communication with the host platform via the USB device interface 474, and ensuring the host platform is aware that device 81 has been coupled thereto.

The authentication coprocessor 460 next determines whether a user registration is necessary. This may occur where device 81 is being used for the first time and no reference pattern(s) of biometric data are stored in non-volatile memory 468. In the event it is determined in step 224 that no reference patterns are stored, pass-through communications between the authentication processor and host are carried out to perform the enrollment process. The host 452 preferably displays instructions to guide the user through the registration process, and the user is prompted to place a finger (or other applicable biometric indicia) on the scanner 458. This obtained biometric data is to be stored as the reference pattern for use in future comparisons with scanned user biometric data when access to the memory 456 is sought. The reference pattern is then encrypted for additional security. Known cryptographic or hashing algorithms may used to encrypt the reference pattern. The encrypted reference pattern is then stored in non-volatile memory 468.

Once the registration process is completed, the graphical user interface may then indicate the successful completion. In the event the authentication coprocessor indicates that there are one or more stored reference patterns, the software scans a user's biometric data to ensure that the user is authorized for access to the information on the memory 456.

The user is prompted in step 1002 to place his or her finger (or other biometric indicia) on the scanner, and the scanned image is digitized and loaded into RAM 470. If an unsatisfactory image is obtained, the user may be prompted to try again. Preferably, the number of retries is user-configurable. Assuming a satisfactory image is obtained, the stored reference patterns(s) are then read from non-volatile memory 468 and loaded into RAM 70, decrypted, and compared against the scanned data. If an appropriate match is found, the host display indicates a successful scan, and access to the data within the memory 456 is granted and a one-time user session OTUS code is received (step 1004).

In embodiments, when user authentication fails, access to the memory 456 is blocked and the appropriate message is can be displayed by the host device 452. Blocking of the memory 456 can be done by various methods, including shutting down or disabling the ASIC controller 454 or the flash interface associated with the memory 456, or configuring the controller to refuse read and write commands. It can also be accomplished by the host device 452. In embodiments, the user may be given the option of repeating step 1002. Preferably the number of retries is user-configurable.

In one embodiment, in the event of a failed authentication, the user may be provided with an option to bypass the fingerprint authentication and provide a password to gain access. If the bypass password is correctly entered, user authentication is deemed to be successful, and access to the data within memory 456 is granted and a one-time user access code may be received. If the bypass password is not properly entered, user verification remains a failure and access is denied. The amount of password entry retries may be user-configurable. It should also be appreciated that if added security is desired, a password requirement can be implemented in addition to the fingerprint authentication even for normal routine authentication within the scope of the present invention.

After proper authentication and receipt of the one-time user access code, the user may access the memory 456 and the distributed computing system. During operation, the user may request access to distributed computing resources (step 1006) by e.g., requesting execution of a process, storage of data in the distributed computing environment, and/or request transmission/access of data stored in the distributed computing environment. The user transmits the OTUS and sends a request to the resource management module 53. The resource management module 53 returns a one-time task code (OTC) to the device 81 (step 1008). The device 81 then requests that the host device 452 send the OTC to distributed computing devices having stored data associated with the user's request or available computing resources to process the user's request (step 1010). The devices authenticate the device 81 using the OTC, data including the request is retrieved by the distributed computing devices and transmitted to the device 81 via the host device 452, preferably encrypted (step 1014). The process is similarly executed for user requests and routines desiring data manipulation such as new data storage.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A portable device operable with a host device, comprising:
   a semiconductor memory storage device;
   a device for receiving authentication data;
   a connector for establishing communication between the portable device and the host device;
   a processor and the memory, and being programmed, via executable program instructions, to perform a method that comprises:
   authenticating a user and the host device with a distributed computing network based upon the received authentication data from the portable device;
   receiving a unique security code having an end-of-session expiration upon authentication;
   utilizing the host computer, identifying a computing task for processing;
   requesting that the computing task be executed over the distributed computing network using the unique security code;
   receiving a one-time task code in response to the request;
   sending the computing task and the one-time task code to the distributed computing network for processing and authentication;
   receiving results of the identified computing task from the distributed computing network, if authenticated;
   storing the received results on the portable device; and
   initiating a virtual machine session between the portable device and the host device.

2. The portable device of claim 1, further comprising: a portable power supply.

3. The portable device of claim 1, wherein the semiconductor memory storage device comprises flash memory.

4. The portable device of claim 1, wherein the authentication data is biometric data that includes one of a fingerprint, a thumbprint, voice data signal and retinal data image.

5. The portable device of claim 1, wherein the distributed computing network comprises a server system residing on a satellite.

6. The portable device of claim 1, wherein the connector is capable of fitting within a USB port on the host device.

7. The portable device of claim 1, wherein the host device is one of a personal computer, a digital camera, a personal digital assistant, a cellular telephone, a vehicle, and a gaming console.

8. The method of claim 1, wherein sending the computing task to the distributed computing network is executing using a store-and-forward routing protocol.

9. The method of claim 1, further comprising:
   selecting a device from among the plurality of devices to process the identified computing task based upon the application functions and data location and at least one associated operating state of the device, and a physical location of the device wherein each device is configured to access a data set.

10. The method of claim 9, wherein the physical location of the device is determined using at least one of GPS data, an IP address, and a cellular communications tower communicatively connected to the device.

11. The method of claim 9, wherein selecting the device to process the identified computing task is further based upon at least one of: historical performance associated with a physical location, historical network performance associated with a physical location, and historical network reliability associated with the device.

12. The method of claim 9, further comprising:
   selecting a device to process the identified computing task from among the plurality of devices based upon predetermined user participation preferences.

13. The method of claim 1, wherein the computing task comprises at least one of: downloading data, uploading data, and computing an application function.

14. The method of claim 1, further comprising:
   authenticating interactions between devices using a key code.

15. The method of claim 1, further comprising:
   initiating a virtual machine session between the portable device and the host device.

16. One or more non-transitory computer-readable storage media storing information to enable one or more computers to perform a method, the method comprising:
   authenticating a user and the host device with a distributed computing network based upon stored authentication data from the portable device;
   receiving a unique security code having an end-of-session expiration upon authentication;
   utilizing the host computer, identifying a computing task for processing;
   requesting that the computing task be executed over the distributed computing network using the unique security code;
   receiving a one-time task code in response to the request;

sending the computing task and the one-time task code to the distributed computing network for processing and authentication;

receiving results of the identified computing task from the distributed computing network, if authenticated;

storing the received results on the portable device; and initiating a virtual machine session between the portable device and the host device.

17. The method of claim 16, wherein the authentication data includes one or more of a username, password, fingerprint, a thumbprint, voice data signal and retinal data image.

18. The method of claim 16, wherein sending the computing task to the distributed computing network is executing using a store-and-forward routing protocol.

19. The method of claim 16, further comprising:

selecting a device from among the plurality of devices to process the identified computing task based upon the application functions and data location and at least one associated operating state of the device, and a physical location of the device wherein each device is configured to access a data set.

20. The method of claim 19, wherein the physical location of the device is determined using at least one of GPS data, an IP address, and a cellular communications tower communicatively connected to the device.

* * * * *